United States Patent [19]

Orcutt

[11] 4,450,872
[45] May 29, 1984

[54] FIBER PIPE PROTECTION FOR WATER COOLED PIPES IN REHEAT FURNACES

[75] Inventor: Donald R. Orcutt, Hanover Park, Ill.

[73] Assignee: The Babcock & Wilcox Company, New Orleans, La.

[21] Appl. No.: 389,722

[22] Filed: Jun. 18, 1982

[51] Int. Cl.³ .............................. F27D 9/00; F27D 3/02
[52] U.S. Cl. .................................... 138/149; 138/144; 138/150; 428/36; 432/234
[58] Field of Search ................ 432/234; 138/144, 145, 138/146, 149, 147, 150; 428/36

[56] References Cited

U.S. PATENT DOCUMENTS

| 1,753,220 | 4/1930 | Stanbery et al. | 432/234 |
| 2,436,452 | 2/1948 | Schmidt | 432/234 |
| 3,226,101 | 12/1965 | Balaz et al. | 432/234 |
| 3,881,864 | 5/1975 | Nicol | 432/234 |
| 4,015,636 | 4/1977 | Van Fossen | 138/149 |
| 4,093,760 | 6/1978 | O'Malley | 432/234 |
| 4,095,937 | 6/1978 | Colburn et al. | 138/150 |
| 4,225,307 | 9/1980 | Magera | 432/234 |
| 4,393,569 | 7/1983 | Byrd, Jr. | 138/149 |

Primary Examiner—William R. Dixon, Jr.
Attorney, Agent, or Firm—Robert J. Edwards; J. Henry Muetterties; Mark B. Quatt

[57] ABSTRACT

A lightweight ceramic refractory covering for water cooled members forming the structural portion of a metallurgical furnace which is thermally insulating and resists wet scale attack, corrosion and vibrational stresses. The covering comprise an inner layer of thermal insulating ceramic refractory fiber blanket, an open weave ceramic cloth about the blanket, an inner layer of veneering mortar, compressed rings or strips of ceramic fiber material, and a hot face layer of veneering coating.

12 Claims, 4 Drawing Figures

FIBER PIPE PROTECTION FOR WATER COOLED PIPES IN REHEAT FURNACES

BACKGROUND AND SUMMARY OF THE INVENTION

This invention relates to insulation for a water cooled member forming a structural portion of a furnace and more particularly to water cooled pipes in reheat furnaces.

In preparation of steel billets, slabs and other metal workpieces for further shaping or forming, it is customary to subject the workpieces to direct heating while passing through a furnace. The billets move through the furnace on skid rails which are supported from below by horizontal and vertical water cooled tubular support members. With this construction, fuel may be burned both above and below the skid rails so that the billets or workpieces may be uniformly heated from all sides.

In the continuous furnace of the type described, the billets or workpieces are generally heated to a temperature on the order of 2000° F. Therefore, the said rails and the support tubes must be protected by sufficient insulating material to minimize the heat lost to the water cooled tubes, and further, to minimize the erosion and corrosion of the tubes resulting from the high temperatures and oxidization environment encountered in the furnace.

In the past, it has been recognized as desirable to insulate these water cooled members by fibrous systems. These systems consisted of applying a lining or covering of fibrous insulating material over the pipes, as shown in U.S. Pat. No. 3,226,101 (Balaz et al) and U.S. Pat. No. 4,095,937 (Colburn et al). However, these systems proved unsatisfactory due to the vulnerability of wet scale attack. Other systems utilized ceramic tiles which were assembled in encircling relationship to the water cooled support members or pipes or a combination of a fibrous inner layer and interlocking ceramic tiles making up the outer layer as shown in U.S. Pat. No. 3,881,864 (Nicol). This system proved more reliable in resisting wet scale attack but were subject to vibration and thermal shock problems which reduced the life of the protective system. In general, however, it had been found that the combination of both fibrous insulation and ceramic tiles covering the fibrous insulation provide the best protection from corrosion caused by furnace gases for the water cooled members. That is, the fibrous insulation thermally insulates the members, and the outer covering of ceramic refractory tiles protect the fibrous insulation from the deleterious effects of the furnace gases. In this combination of insulation and ceramic tiles, the encircling ceramic tiles are subjected to intense vibrational loadings caused by movement of the billets on the skid rail and large thermal stresses as a result of temperature gradients which may cause cracking of the tiles. The internal stresses are more pronounced in the vicinity of the engagement means employed to interlock adjacent tiles or members. In general, the aforementioned engagement means consists of a metallic stud welded to the tubular support member and for interlocking lug members formed in the ceramic tiles, such as shown in U.S. Pat. No. 2,436,452 (Schmidt). Furthermore, the complex arrangement generally employed in holding the ceramic tile members together about the tubular support member renders replacement of a single ceramic section quite difficult.

Thereafter, a covering was developed which insulated the tubular members, which protected the insulation from the furnace gases, and minimized the magnitude of internal stress imposed thereon. This covering consists of thermal insulating layer of ceramic fiber wrapped around the fluid conveying tubular member, an inner ceramic refractory layer of split tiles and an outer layer of ceramic refractory tile forming a unitary collar, as shown in U.S. Pat. No. 4,015,636 (Van Fossen). However, the high density of this covering system renders it vulnerable to intense vibrational loading.

Therefore, it is the object of this invention to provide a covering for water cooled members in a furnace which has good thermal insulating properties, which is resistant to scale attack and internal stresses and which has a low density in order to avoid vibrational loading stresses caused by movement of the billets on the skid rails.

In accordance with the present invention the water cooled furnace support members are provided with a refractory covering comprising a thermal insulating ceramic blanket layer disposed about and contacting the member, a ceramic or fiberglass cloth wrapped about the blanket and a veneering mortar layer applied thereon, a layer or rings or strips of a ceramic fiber material is disposed about and contacting the veneering mortar, and a hot face veneering coating layer is applied to the rings of ceramic fiber material.

Specifically, the low density refractory covering for the water cooled furnace members includes a thermal insulation material such as a ceramic fiber blanket wrapped around the member to be insulated. Ceramic fiber cloth woven in an open weave ("fish net"), is wrapped about the thermal insulation blanket in order to hold it onto the insulated member. The weave must be such that it allows penetration of the cloth by an alumina-silica high temperature fiber veneering mortar. The mortar is generally sprayed or troweled onto the cloth, and thereafter penetrates into the ceramic fiber blanket. Rings of ceramic fiber material are placed atop the unset mortar. These rings are wrapped in a compressed relationship with respect to each other so as to take consideration any shrinkage which may occur. Alternatively, strips of ceramic fiber blanket can be spirally wrapped around the veneering mortar. The rings or strips of ceramic fiber are applied before the veneering mortar has set, therefore the rings or strips are held in place by adhesion to the mortar while a final hot face veneering coating is applied. The hot face coating has a high alumina content, the composition being designed for use with the particular ceramic fiber material chosen to be used as rings or strips. It is important that this coating is compatible with the ceramic fiber because shrinkage of the fibers during heating would cause the coating to flake off.

DETAILED DESCRIPTION OF THE INVENTION

For a more complete appreciation of the invention, attention is invited to the following description of the invention as shown in the attached drawings.

Figure 1:
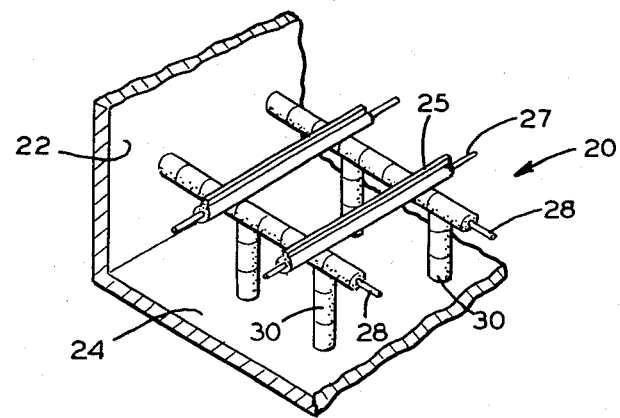
FIG. 1 is a perspective view of a portion of a furnace including water cooled pipe structures which are protected by the refractory covering of the present invention.

Referring to FIG. 1, a reheat furnace 20 is illustrated with a side wall 22 and floor 24. The skid rails 25 are directly mounted upon generally horizontally extending water cooled tubes or members 27, which are in turn supported by transverse and vertically extending water cooled support tubes or members 28 and 30. In the construction shown, the remaining side and end walls and the roof of furnace are not illustrated since such construction is common in the art. Moreover, it will be understood that heat is applied to the heating furnace in the customary manner either by fuel combustion or by other heating means.

Figure 2:
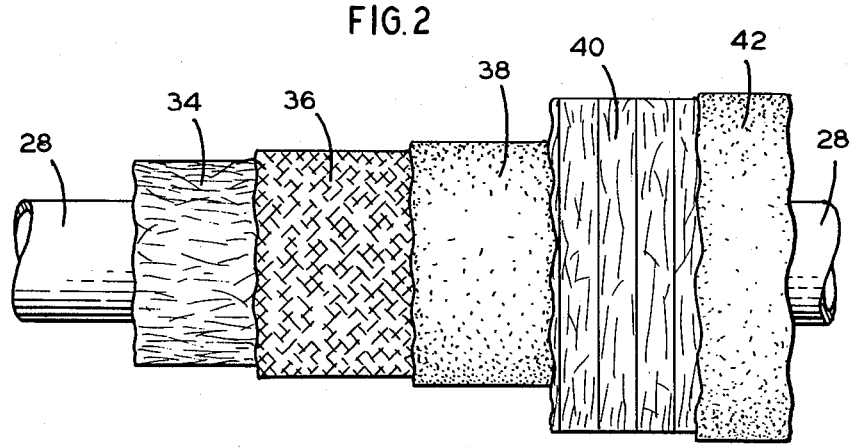
FIG. 2 is a side view of a preferred embodiment of the refractory covering of the present invention.
Figure 3:
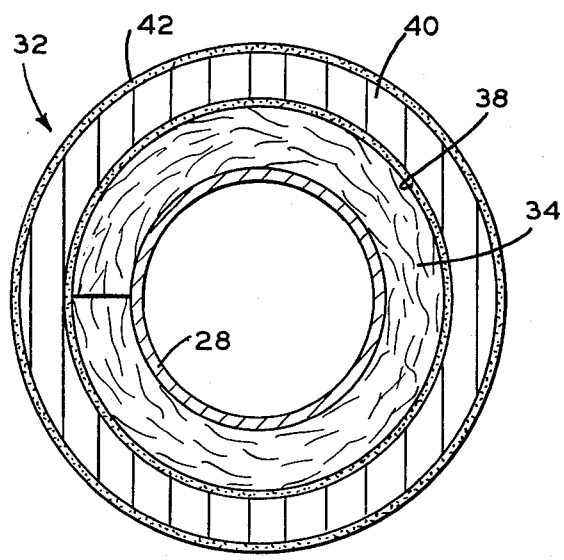
FIG. 3 is a sectional view of FIG. 2 taken along line 3—3.

One form of the ceramic refractory fiber covering 32 of the present invention is illustrated in FIGS. 2 and 3 in connection with a horizontal water cooled support member, the crossover pipe 28. As shown, the crossover pipe 28 is covered with a layer of fibrous thermal insulation ceramic blanket 34. Thereafter a ceramic or fiberglass cloth 36 (not shown in FIGS. 3 and 4) is wrapped around the ceramic blanket 34 to hold the blanket in place. This ceramic cloth 36 is of an open weave type so that it will freely accept a veneering mortar or cement coating 38 applied to it. The veneering mortar used is an alumina-silica, high temperature fiber veneering mortar of either an air or chemical setting type, capable of setting at ambient temperature. The veneering mortar 38 can be sprayed or troweled on the cloth 36, and thereafter penetrates into the fibers of the ceramic blanket 34. The ceramic blanket 34 and the cloth 36 provide a base for the veneering mortar 38 to adhere to. The mortar 38 provides a surface for rings or strips of ceramic blanket 40 to be mortared thereto. These ceramic blanket rings or strips 40 are preferrably constructed of a light weight, high temperature ceramic fiber material. The rings 40 are compressed together width-wise along the perimeter of the mortar 38 so that no gaps will appear when shrinkage occurs during furnace heat-up. However, rings or strips 40 can also be replaced by ceramic fibrous ropes which are helically wrapped about the mortar 38. A hot faced veneering coating 42 having a high alumina or chromium content is applied to the rings 40. The coating 42 can be either air or chemically setting. It is important to use a coating which is compatible with the ceramic fiber material which comprised the rings 40 in the terms of shrinkage and adhesion of the coating to the fibers. Problems will occur if the coating is improperly chosen, ie, either the coating will crack off due to its inability to shrink along with the fibrous material or it will fail to adhere to the fibers or it may chemically react with the fibers.

It is also envisioned that a satisfactory refactory covering comprised of the ceramic blanket 34, the cloth 36, and the veneering mortar 38 can be used in the cooler sections of the reheat furnace. This covering is especially useful in those areas where there is little chance of wet scale attack and where the gas jet velocity is low.

More particularly, a ceramic fiber blanket 34, eg. KAOWOOL, a alumina-silica ceramic fiber blanket made by The Babcock & Wilcox Company, 0.25 to 2.5 inches thick is wrapped around the crossover or upright pipe, 28 or 30 respectively, to be insulated. In order to retain the blanket 34 in place to complete the insulation covering of the pipe, a ceramic fiber cloth, eg. NEXTEL (a trademark of the Minnesota Manufacturing and Mining Corporation), is wrapped around the ceramic blanket 34. The cloth 36, because of its open weave design, allows penetration of a veneering cement 38 through to the ceramic blanket 34. The veneering cement 38 should be a high quality alumina-silica high temperature fiber veneering mortar, eg. UNISTIK A or SMOOTHSET (both trademarks of The Babcock & Wilcox Company) or FREEPORT 3000 (sold by Freeport Brick Company). However, any mortar which is dimensionally and chemically compatible with the cloth 36 and the fiber rings 40 such as a sodium silicate bonded mortar or a phosphate bonded mortar can be used. The veneering cement 38 is typically sprayed on to a thickness of about ⅛ to ¼ inches. Thereafter, rings or strips 40 of ceramic fiber blanket are added. It is preferable to use 2 inch wide rings, 1.0 to 2.0 inches thick (radially), though the longitudinal width can be varied from 1 to 3 inches to suit the particular installation requirements. It is necessary to apply the rings, strips or rope so that they are under compression with respect to the adjacent rings, strips or rope. For example, strips totaling 15 inches in longitudinal width are used to cover 12 inches of pipe length. In order to protect the whole system from scale attack and the hostile furnace environment created by the furnace gases a final hot face surface coating 42, 1/16 to ⅛ inches thick, is applied, eg. UNIKOTE-S veneering cement (a trademark of The Babcock & Wilcox Company).

Figure 4:
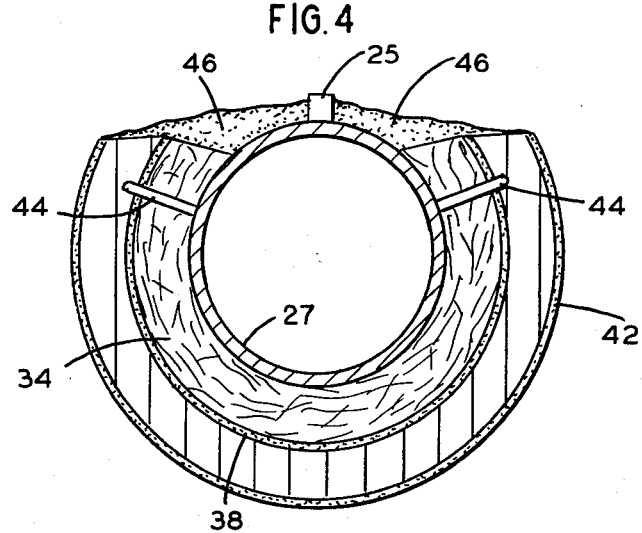
FIG. 4. is a sectional view of the preferred embodiment of the refractory covering when applied to the skid members.

The covering 32, as applicable to skid pipes 27, is shown in FIG. 4. The skid pipe 27 has metallic anchors 44 attached thereto by a standard stud gun. Anchors 44 are of such a length that they are completely insulated from the furnace environment by the coating 32. The ceramic blanket 34 and ceramic cloth 36 are impaled over the anchors 44 to provide the necessary structural strength to support the fibers insulation covering since the covering can not completely surround a skid pipe 27. Thereafter, as with crossover and upright pipes, 28 and 30 respectively, the inner veneering mortar 38 is applied. Compressed strips 40 of ceramic fiber are then wrapped about the veneering mortar 38. As outlined above, the strips 40 are in a compressed state in relation to the adjacent strips in order to avoid any voids or gaps caused by shrinkage of the fibrous material during heat up. The hot face layer of veneering coating 42 is then applied to the exposed surface area of the strips 40. A refractory mortar 46 is used to fill in gaps which occur on either side of the skid rail 25, generally veneering mortar 38 is used.

The embodiment of the invention in which an exclusive property or privilege is claimed are defined as follows:

1. A refractory covering for application to a fluid conveying member comprising a thermal insulating ceramic fiber blanket layer disposed about and contacting the member; a cloth wrapped about the blanket, said cloth of an open weave type which permits penetration of a veneering mortar therethrough; and a layer of said veneering mortar applied to the cloth, said veneering mortar being dimensionally and chemically compatible with said cloth.

2. A refractory covering for application to a fluid conveying member comprising a thermal insulating ceramic fiber blanket layer disposed about and contacting the member; a cloth wrapped about the blanket, said cloth of an open weave type which permits penetration of a veneering mortar therethrough; a layer of said veneering mortar applied to the cloth, said veneering mortar being dimensionally and chemically compatible with said cloth; a layer of rings of ceramic fiber material disposed about and contacting the veneering mortar; and a hot face veneering coating layer applied to the rings of ceramic fiber material.

3. The refractory covering according to claims 1 or 2 wherein the thermal insulating ceramic fiber blanket layer is about 0.25 to 2.5 inches in radial thickness.

4. The refractory covering according to claim 1 or 2 wherein the cloth is a ceramic cloth.

5. The refractory covering according to claim 1 or 2 wherein the cloth is a fiberglass cloth.

6. The refractory covering according to claim 2 wherein the ceramic fiber material is applied in helically wrapped strips.

7. The refractory covering according to claim 2 wherein the ceramic fiber material is in rope form.

8. The refractory covering according to claim 2 wherein the veneering coating has a high alumina content.

9. The refractory covering according to claim 2 wherein the veneering coating has a high chrome content.

10. The refractory covering according to claims 1 or 2 wherein the veneering mortar is a high quality, alumina-silica high temperature fiber veneering mortar.

11. The refractory covering according to claims 1 or 2 wherein the veneering mortar is a sodium silicate bonded mortar.

12. The refractory covering according to claims 1 or 2 wherein the veneering mortar is a phosphate bonded mortar.

* * * * *

UNITED STATES PATENT AND TRADEMARK OFFICE
CERTIFICATE OF CORRECTION

PATENT NO. : 4,450,872
DATED : May 29, 1984
INVENTOR(S) : Donald R. Orcutt

It is certified that error appears in the above-identified patent and that said Letters Patent are hereby corrected as shown below:

Column 2, line 45, after "take", insert --into--.

Signed and Sealed this

Fourth Day of December 1984

[SEAL]

Attest:

GERALD J. MOSSINGHOFF

*Attesting Officer*    *Commissioner of Patents and Trademarks*